May 20, 1952  P. A. MARSAL ET AL  2,597,116
AIR DEPOLARIZED CELL
Filed Sept. 30, 1948
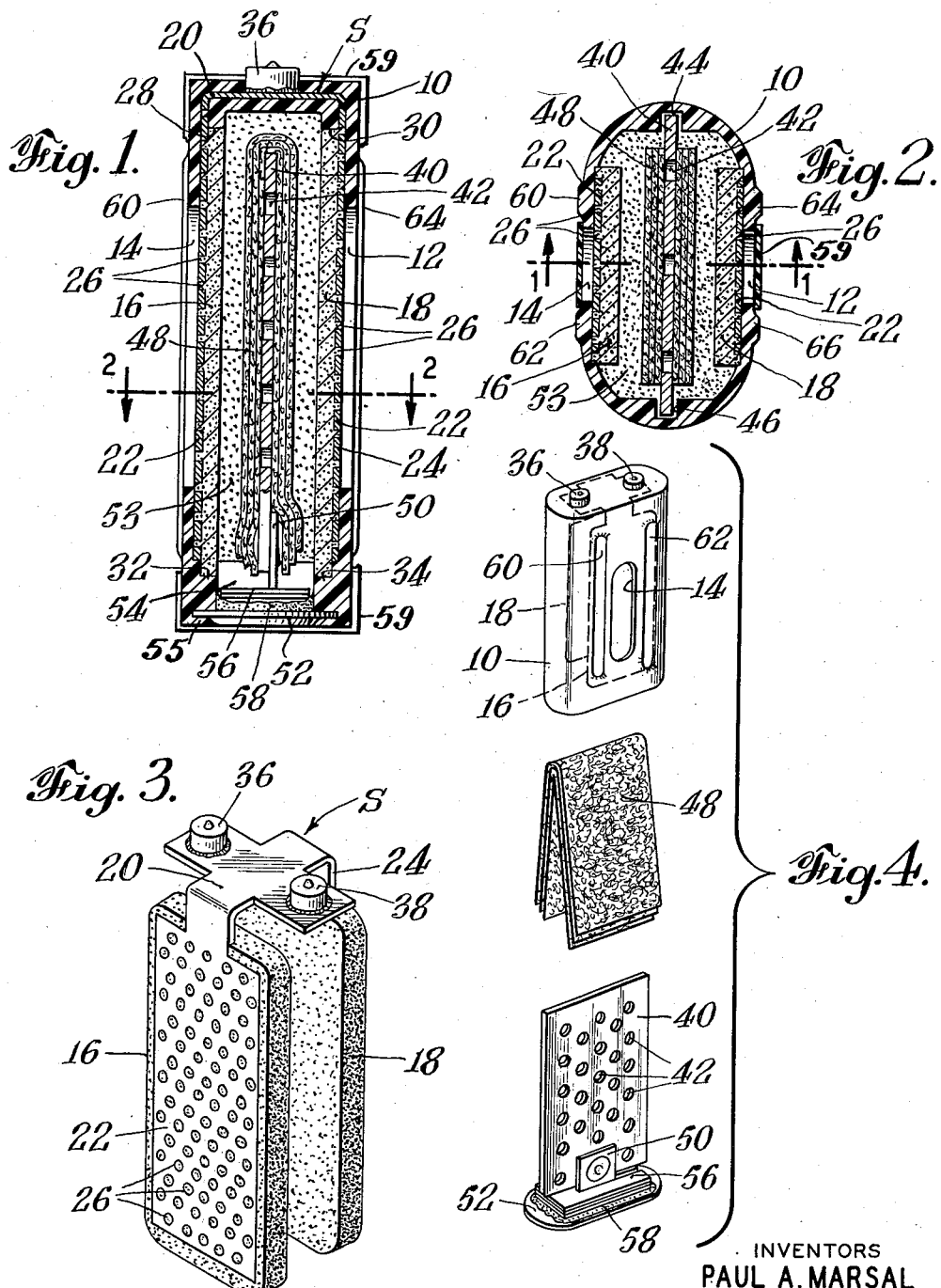
INVENTORS
PAUL A. MARSAL
RUSSELL P. FOX
BY
ATTORNEY Patented May 20, 1952

2,597,116

UNITED STATES PATENT OFFICE 2,597,116

AIR DEPOLARIZED CELL

Paul A. Marsal, Rocky River, and Russell P. Fox, Cleveland, Ohio, assignors, by mesne assignments, to Union Carbide and Carbon Corporation, a corporation of New York Application September 30, 1948, Serial No. 52,018

13 Claims. (Cl. 136—136)

This invention relates to primary cells of the air depolarized type and refers more particularly to an improved construction of such cells.

Air depolarized cells of the type employing a carbonaceous electrode, a zinc electrode and a caustic electrolyte have proved to have highly desirable characteristics and have met with considerable commercial success but their field of use has been limited because of their relatively large size and weight as compared with the so-called dry cells of the zinc-carbon-manganese dioxide-ammonium chloride type.

It is a principal object of this invention to provide an improved construction of air depolarized cells of the carbon-zinc-alkali system which makes possible the production of cells of this type which are far smaller and lighter than the conventional air depolarized cells presently in commercial use. More specifically, it is an object of the invention to provide a miniature air depolarized cell suited for use in such devices as hearing aids. Another object is the provision of a leakproof air depolarized cell.

The invention by means of which these objects are attained comprises an air depolarized cell having a carbonaceous cathode, a zinc anode, and an immobilized electrolyte all held within a substantially leakproof container. The invention will be described in detail with reference to the drawings in which:

Fig. 1 is a vertical section, taken along the line 1—1 of Fig. 2, of an air depolarized cell embodying the invention;

Fig. 2 is a horizontal section taken along the line 2—2 of Fig. 1;

Fig. 3 is an elevational view of the carbonaceous electrodes of the cell illustrated in Fig. 1;

Fig. 4 is an exploded view showing on a reduced scale the separate elements of the cell shown in Fig. 1.

Referring to the drawings, a typical example of a cell embodying the invention comprises a container 10 which may be of metal but is preferably composed of a thermoplastic insulating resin molded about the elements of the cell as will be described below. The container 10 is provided with apertures 12, 14 in opposite side walls for the admission of air to a pair of carbonaceous electrodes 16, 18 mounted on a metal support S having an inverted U-shape. The support S comprises a yoke 20 embedded in the top of the container 10, and two legs 22, 24 extending down opposite side walls of the container 10 on the inside thereof and contiguous thereto. Perforations 26 are provided in both legs 22, 24. Each of the electrodes 16, 18 comprises a block of carbon secured to one of the legs 22, 24. Preferably the legs 22, 24 are embedded in the carbon blocks and carbon also fills the perforations 26 in the legs 22, 24 of the support S. The carbonaceous electrodes 16, 18 are held rigidly between internal shoulders 28, 30, 32, 34 at the top and bottom of the container 10.

A pair of terminals 36, 38 extending through the top end of the container 10 is provided on the yoke 20 of the support S. These terminals may be the conventional brass terminals of ordinary dry cells welded or soldered to the yoke 20 or may be embossed on the yoke 20.

Thus, the support S serves several functions in the construction of the invention. It serves to connect the carbon blocks 16, 18 together and offers mechanical protection to them. Further, the support S serves as a current-collecting device and provides external electrical connection to the carbon blocks 16, 18.

A zinc electrode 40 amalgamated in accordance with conventional practice, in the form of a flat sheet preferably provided with perforations 42 is mounted in grooves 44, 46 provided in opposite sides of the container 10. A pad 48 formed of several layers of fibrous material such as glass wool, rayon paper, or floccose alkali-resistant resin, for example polyamide or vinyl copolymer resins is folded over and is in contact with the active surfaces of the zinc electrode 40. A preferred type of pad is described and claimed in United States patent application Serial No. 112,204, filed August 25, 1949, by P. S. Brooks and E. A. Schumacher. Attached to the bottom of the zinc electrode 40, for example by riveting, is a tab 50 suitably composed of copper coated steel, attached at its other end to a metal, suitably steel, plate 52 which is so constructed as to form a closure for the container 10. This tab 50 thus provides for external electrical connection to the zinc electrode 40 while making possible the complete immersion of the zinc electrode 40 in electrolyte, thereby avoiding air corrosion of the zinc. The intervening space between the carbonaceous blocks 16, 18 and the fibrous pad 48 is filled with an immobilized electrolyte 53, the pad 48 serving to support such electrolyte. An air space 54 is left at the bottom of the container 10, into which the lower portions of the carbon blocks 16, 18 extend for the purpose of venting any gas formed during discharge of the cell. Such gas passes through the carbon and out the apertures 12, 14. To prevent filming of the carbon with liquid, which would prevent such venting, the lower portions of the carbon blocks are given a surface treatment with a moisture repellent, suitably with a barium stearate grease at any convenient time. This venting system is described in detail and claimed in United States patent application Serial No. 113,502, filed September 1, 1949, by E. A. Schumacher and R. J. Bennett. A plurality of bibulous washers 56 fit over the tab 50 and are located within the air space 54 between the bottom edge of the zinc electrode 40 and a layer 58 of wax provided on the inner surface of the metal closure plate 52. The wax layer 58 internally seals the cell. The bottom edge of the container 10 is flanged inwardly over and sealed by a thermoplastic cement on the bottom edges of the metal closure plate 52 as shown at 55 in Fig. 1 thus providing an external seal for the cell. Bosses 60, 62, 64, 66 are provided on the container 10 adjacent to the apertures 12, 14 so that when the cell is placed in contact with a flat surface there will be space between the container and such surface, permitting access of air to the apertures 12, 14.

The cell of the invention is quite simple to construct. For example, the electrode support S may be stamped to shape from a thin strip of steel, which preferably has been coated with a conductive carbonaceous paint of the type conventionally used in the duplex electrodes of flat-type dry cells, the intended leg portions being perforated during this stamping operation. The terminals 36, 38 may then conveniently be provided on the yoke 20. The carbon blocks 16, 18 may then be molded about the intended leg portions of the strip, suitably from a mix comprising the electrode material defined in United States Patent 2,010,608 in comminuted form, a resinous binder, and a waterproofing agent such as oil, petrolatum or the rubber solution described in United States Patent 2,017,280 or mixtures thereof. The metal support S may then be formed into the U-shape illustrated in Fig. 3, and a thin coating of thermoplastic cement placed on the margins of the leg portions 22, 24. The assembly is now ready for placement in the container 10.

As above stated, the container may be of metal but is preferably of plastic, and in the preferred construction illustrated in the drawing is formed by injection molding. With this type of construction the assembly of the support S, the terminals 36, 38 and the carbon blocks 16, 18 is placed on a suitable supporting form in a split mold. This mold, so designed as to provide in cooperation with the form the apertures 12, 14, shoulders 28, 30, 32, 34 and the grooves 44, 46 desired in the finished container, is then placed about the form and a thermoplastic resin injection molded about the support S. In this operation the resin used to form the container, the thermoplastic coated margins of the legs 22, 24 of the support S, and the resinous binder used in the formation of the carbon blocks 16, 18 are integrally united, the heat applied during the molding operation being sufficient to soften the resinous binder, thus forming a strong, leakproof bond adjacent to the apertures 12, 14 of the finished container 10. This bond is actually stronger than the carbonaceous electrode. By this construction, the carbonaceous electrode 16, 18, the metal support S carrying the terminals 36, 38 and the container 10 constitute a single unit of the cell.

Into the container 10 may now be placed the electrolyte 53. The electrolyte preferably used is a solution of sodium hydroxide and zinc oxide in water, in proportions of about 1 part zinc oxide, 3½ parts sodium hydroxide and 11 parts water by weight. This solution is preferably immobilized by the incorporation of starch in a proportion of about one-third part by weight in the solution. This electrolyte composition is described and claimed in United States patent application Serial No. 67,758, filed December 28, 1948 by E. A. Schumacher and P. S. Brooks. Sufficient of the electrolyte solution is poured into the container 10, held top down of course, so that when the electrode 40 and pad 48 are inserted, the intervening space between the carbon blocks 16, 18 and the pad 48 is substantially filled with electrolyte solution leaving the air space 54. With the container still held top down the fibrous pad 48 may be folded over the zinc electrode 40 and the electrode 40 and pad 48 inserted in the container 10, opposite edges of the electrode 40 engaging the grooves 44, 46 provided in the container 10. The electrode 40 and pad 48 are pushed into the container 10 until the inner surface of the metal closure plate 52 engages the shoulders 32, 34.

After the electrolyte-starch solution has set, the container may be turned top up. The bottom of the container 10 is then locally heated to soften the plastic of which it is composed, and the softened ends inwardly flanged over the metal closure plate 52 as shown at 55 in Fig. 1. By such application of heat, the thermoplastic cement on the closure plate 52 and the wax layer 58 are softened, the former sealing the plastic of the container 10 to the closure plate 52 and the latter forming an internal seal as shown for example in United States Patent 2,244,016. The cell is now complete. Preferably the apertures 12, 14 of the completed cell are covered with a removable material 59 (Figs. 1 and 2) of low moisture-vapor transmission to protect the cell from drying out. This covering is removed before the cell is put to use.

It is of the utmost importance that a cell to be used in devices such as hearing aids carried on the person be of leakproof construction for obvious reasons. The cell of this invention is leakproof by virtue of the sealing into the container of all of the elements of the cell. Leakage of electrolyte through the carbon of the electrodes 16, 18 is prevented by the waterproofing agent incorporated in the carbon. Leakage around the apertures 12, 14 is prevented by the bond formed between the plastic of the container 10, the thermoplastic cement on the metal legs 22, 24, and the resinous binder in the carbon of the electrodes 16, 18. To secure this bond it is essential that the resin used in the carbon mix, the thermoplastic cement and the container be compatible with each other, although any thermoplastic resin may be used and different resins may be used for each of these elements of the cell if desired.

The cell of the invention has all of the excellent electrical characteristics of conventional air depolarized cells. In contrast to such conventional cells, however, it may be made in very small sizes. For instance for use in hearing aids a cell may be constructed about two inches tall, one inch wide and one-half inch thick, that is of the same size as the smallest "A" batteries now conventionally used in such devices. Its advantages over the conventional Le Clanche cells used in hearing aids lie in its far longer life, about threefold, and its relatively constant voltage.

Although a method of constructing the cell of the invention has been given herein in some detail, this description has been by way of example merely. Similarly, although preferred materials to be used in the cell have been mentioned, it will be apparent that other materials may be used as well. Minor structural changes will also occur to those skilled in the art, as for example, the replacement of the terminals 36, 38 with a single terminal, but such modifications are within the scope of the invention.

We claim:

1. In an air depolarized cell a container having apertures in opposite walls for the entry of air; a plurality of air-permeable, electrolyte-repellent carbonaceous electrodes spaced apart from each other and bonded to the interior walls of said container and covering the apertures therein; a current-collecting device attached to said electrodes; a terminal electrically connected to said current-collecting device and extending outwardly of one end of said container; a zinc electrode interposed in said container between said carbonaceous electrodes; an immobilized aqueous electrolyte in contact with said carbonaceous electrodes and said zinc electrode; and a metal closure for the other end of said container, said closure providing electrical connection to said zinc electrode; both ends of said container being sealed against leakage, and said carbonaceous electrodes preventing leakage of liquid through said apertures.

2. In the combination defined by claim 1 the improved construction wherein said current-collecting device comprises a strip of metal embedded in said carbonaceous electrodes.

3. In an air depolarized cell a container having apertures on opposite sides thereof for the entry of air; a pair of air-permeable, electrolyte-repellent carbonaceous electrodes spaced apart from each other and bonded to the interior walls of said container and covering said apertures; a current-collecting device attached to said electrodes and provided with an electrical contact extending outwardly of one end of said container; a zinc electrode interposed in said container between said carbonaceous electrodes; an immobilized aqueous electrolyte in contact with said carbonaceous electrodes and said zinc electrode; and a metal closure for the other end of said container, said closure providing electrical connection to said zinc electrode; said container being sealed against leakage at both ends thereof and said carbonaceous electrodes preventing leakage of liquid from said apertures.

4. In an air depolarized cell a container having apertures in opposite side walls thereof for the entry of air; a pair of air-permeable, electrolyte-repellent carbonaceous electrodes spaced apart from each other and bonded to the interior walls of said container adjacent to said apertures, said electrodes covering said apertures; a metal strip attached to both of said carbon electrodes; a terminal electrically connected to said strip and extending outwardly of one end of said container; a zinc electrode interposed between said carbonaceous electrodes in said container; an immobilized aqueous electrolyte in contact with said carbonaceous electrodes and said zinc electrode; and a metal closure on the other end of said container, said closure providing electrical connection to said zinc electrode; said container being sealed against leakage at both ends thereof and said carbonaceous electrodes preventing leakage of liquid through said apertures.

5. In an air depolarized cell a container having apertures in opposite side walls thereof for the entry of air; a pair of air-permeable, electrolyte-repellent carbonaceous electrodes spaced apart from each other and bonded to the interior walls of said container, said electrodes covering said apertures; a metal support embedded in said electrodes connecting the same and serving as a current-collecting device; a terminal electrically connected to said metal support and extending outwardly of the top of said container; a zinc electrode interposed in said container between said carbonaceous electrodes; an immobilized aqueous electrolyte in contact with said carbonaceous electrodes and said zinc electrode; and a bottom closure for said container providing electrical connection to said zinc electrode; said container being sealed against leakage at its top and bottom and said carbonaceous electrodes preventing leakage of liquid through said apertures.

6. In an air depolarized cell a container having apertures in opposite side walls thereof for the entry of air; a pair of air-permeable, electrolyte-repellent carbonaceous electrodes spaced apart from each other and bonded to the interior walls of said container, said electrodes covering said apertures; a metal support embedded in said electrodes connecting the same and serving as a current-collecting device; a terminal electrically connected to said metal support and extending outwardly of the top of said container; a zinc electrode interposed in said container between said carbonaceous electrodes; a fibrous, electrolyte-permeable alkali-resistant pad contiguous to the active surfaces of said zinc electrode; an immobilized aqueous electrolyte in contact with said carbonaceous electrodes, zinc electrode, and fibrous pad; and a bottom closure for said container providing electrical connection to said zinc electrode; said container being sealed at top and bottom against leakage and said carbonaceous electrodes preventing leakage of liquid through said apertures.

7. In an air depolarized cell a container having apertures in opposite side walls thereof for the entry of air; a pair of air-permeable, electrolyte-repellent carbonaceous electrodes spaced apart from each other and bonded to the interior walls of said container, said electrodes covering said apertures; a metal support having a yoke and a pair of perforated legs, each of said legs being embedded in one of said carbonaceous electrodes; a terminal electrically connected to said yoke and extending outwardly of the top of said container; a zinc electrode interposed in said container between said carbonaceous electrodes; a fibrous electrolyte-permeable, alkali-resistant pad contiguous to the active surfaces of said zinc electrode; an immobilized electrolyte in contact with said carbonaceous electrodes, fibrous pad and zinc electrode; and a bottom closure for said container providing electrical connection to said zinc electrode; said container being sealed at top and bottom against leakage, and said carbonaceous electrodes preventing leakage of liquid through said apertures.

8. In an air depolarized cell a plastic container having apertures in opposite side walls thereof for the entry of air; a pair of air-permeable, electrolyte - repellent carbonaceous electrodes spaced apart from each other and bonded to the interior walls of said container, said electrodes covering said apertures; a metal support having a yoke and a pair of perforated legs, each of said legs being embedded in one of said carbonaceous electrodes and said yoke being embedded in said container; a terminal electrically connected to said yoke and extending outwardly of the top of said container; a zinc electrode interposed in said container between said carbonaceous electrodes; a fibrous, electrolyte-permeable, alkali-resistant pad contiguous to the active surfaces of said zinc electrode; an immobilized electrolyte in contact with said carbonaceous electrodes, fibrous pad and zinc electrode; and a bottom closure for said container providing electrical connection to said zinc electrode; said container being sealed at top and bottom against leakage, and said carbonaceous electrodes preventing leakage of liquid through said apertures.

9. In an air depolarized cell a container having apertures in opposite side walls for the entry of air; a pair of air-permeable electrolyte-repellent carbonaceous electrodes bonded to the interior walls of said container and covering said apertures; a current-collecting device connected to said carbonaceous electrodes; a terminal electrically connected to said current-collecting device and extending outwardly of one end of said container; grooves formed in opposite side walls of said container for the reception of a zinc electrode; a flat zinc electrode mounted in said grooves and having its active surfaces between said carbonaceous electrodes; an immobilized electrolyte in contact with said carbonaceous electrodes and said zinc electrode; and a closure for the other end of said container, said closure providing electrical connection to said zinc.

10. In an air depolarized cell a plastic container having apertures in opposite side walls thereof for the entry of air; a pair of air-permeable, electrolyte-repellent carbonaceous electrodes spaced apart from each other and bonded to the interior walls of said container, said electrodes covering said apertures; a metal support having a yoke and a pair of perforated legs, each of said legs being embedded in one of said carbonaceous electrodes and said yoke being embedded in said container; a terminal electrically connected to said yoke and extending outwardly of the top of said container; grooves formed in opposite side walls of said container for the reception of a zinc electrode; a flat zinc electrode mounted in said grooves and having its active surfaces between said carbonaceous electrodes; a metal tab attached to said zinc electrode and to a metal bottom closure for said cell providing external electrical connection to said zinc electrode; said container being sealed at top and bottom against leakage, and said carbonaceous electrodes preventing leakage of liquid through said apertures.

11. In an air depolarized cell as defined in claim 10 the improvement which comprises a fibrous pad of electrolyte-permeable, alkali-resistant material contiguous to the active surfaces of said zinc electrode.

12. A method of making an air depolarized cell, which method comprises molding a carbonaceous electrode from a mix containing comminuted carbon, a resin binder and an electrolyte-repelling agent onto a metal support, placing the electrode and support in a mold and molding an open-ended, cup-shaped container of a thermoplastic resin compatible with the resin binder of said mix about said electrode and support, thus bonding said electrode and support integrally to the container so formed; inserting in said container a zinc electrode and an electrolyte; closing said container with a metal closure; and re-molding the open end of said container about said metal closure.

13. A method of sealing against leakage of liquid an air depolarized cell comprising a container having apertures therein for the entry of air to an air-permeable carbonaceous electrode, which method comprises molding said electrode from a mix comprising comminuted carbon and a resinous binder; injection molding an open-ended, cup-shaped container about said carbonaceous electrode of a thermoplastic resin compatible with said resinous binder; applying sufficient heat in said molding operation to soften said resinous binder, thus causing said resinous binder and said thermoplastic resin to unite integrally wherever contact occurs between them; inserting a closure in the open end of the container thus produced; inwardly flanging the open end of said container about the edges of said closure and sealing the so-flanged portions of said container to said closure by a thermoplastic cement.

PAUL A. MARSAL.
RUSSELL P. FOX.

REFERENCES CITED

The following references are of record in the file of this patent:

UNITED STATES PATENTS

| Number | Name | Date |
|---|---|---|
| 208,614 | Lauder | Oct. 1, 1878 |
| 406,223 | Lee | July 2, 1889 |
| 1,258,257 | Sangers | Mar. 5, 1918 |
| 1,673,198 | Martus et al. | June 12, 1928 |
| 1,856,680 | Williams et al. | May 3, 1932 |
| 1,924,314 | Heise | Aug. 29, 1933 |
| 2,050,172 | Gordon | Aug. 4, 1936 |
| 2,154,312 | MacCallum | Apr. 11, 1939 |
| 2,207,734 | Heise et al. | July 16, 1940 |
| 2,213,429 | Heise et al. | Sept. 3, 1940 |
| 2,307,765 | Deibel | Jan. 12, 1943 |
| 2,409,841 | Donkin | Oct. 22, 1946 |
| 2,422,045 | Ruben | June 10, 1947 |
| 2,450,813 | Reinhardt et al. | Oct. 5, 1948 |

FOREIGN PATENTS

| Number | Country | Date |
|---|---|---|
| 11,399 | Australia | Feb. 17, 1933 |
| 224,484 | Switzerland | Mar. 1, 1943 |
| 487,294 | Great Britain | June 17, 1938 |